United States Patent [19]

Browne et al.

[11] Patent Number: 5,017,904

[45] Date of Patent: May 21, 1991

[54] BRAKING INDICATOR SYSTEM

[75] Inventors: Alan L. Browne; Yuen-Kwok Chin, both of Grosse Pointe, Mich.

[73] Assignee: General Motors Corporation, Detroit, Mich.

[21] Appl. No.: 509,124

[22] Filed: Apr. 16, 1990

[51] Int. Cl.$^5$ .............................................. B60Q 1/46
[52] U.S. Cl. ..................................... 340/479; 340/467
[58] Field of Search ............... 340/453, 463, 467, 479, 340/436; 188/1.11; 303/103

[56] References Cited

U.S. PATENT DOCUMENTS

| | | | |
|---|---|---|---|
| 2,927,302 | 3/1960 | Steigerwald | 340/453 |
| 3,629,815 | 12/1971 | Hatting | 340/467 |
| 3,668,629 | 6/1972 | Pawl | 340/483 |
| 4,876,525 | 10/1989 | Gross | 188/1.11 X |

FOREIGN PATENT DOCUMENTS

| | | | |
|---|---|---|---|
| 3400806 | 7/1985 | Fed. Rep. of Germany | 340/453 |
| 3804094 | 8/1989 | Fed. Rep. of Germany | 340/479 |

Primary Examiner—Joseph A. Orsino
Assistant Examiner—B. R. Tumm
Attorney, Agent, or Firm—Edward J. Biskup

[57] ABSTRACT

A vehicle braking indicator system that provides a continuous lighting of the vehicle stop light under normal braking conditions but causes the stop light to be intermittently lighted at a relatively high frequency when the anti-lock braking system of the vehicle is activated.

3 Claims, 1 Drawing Sheet

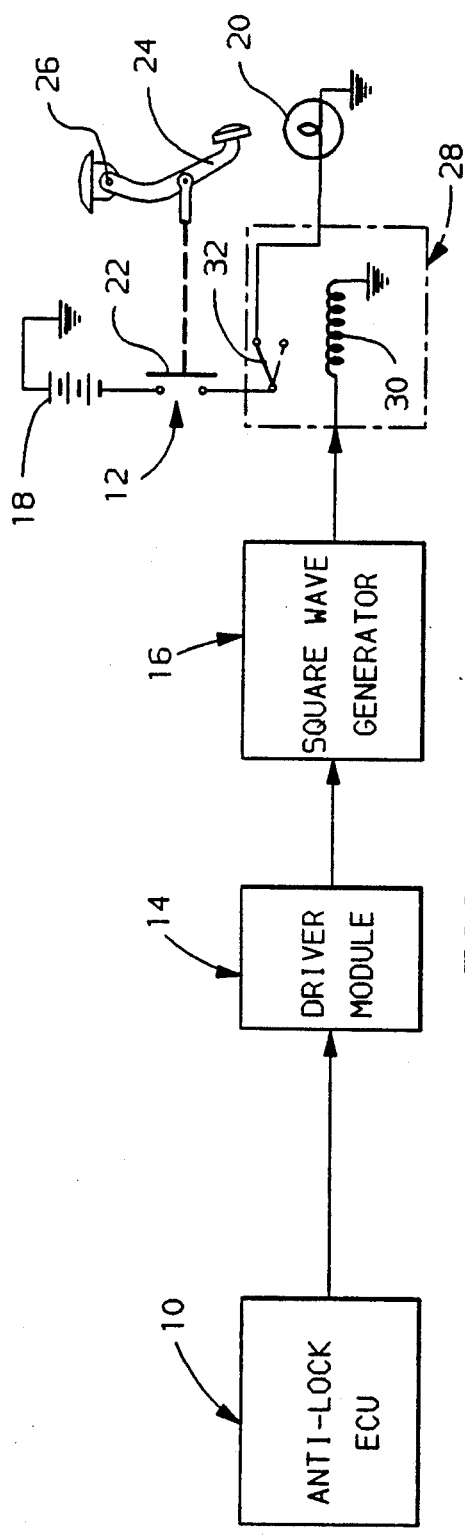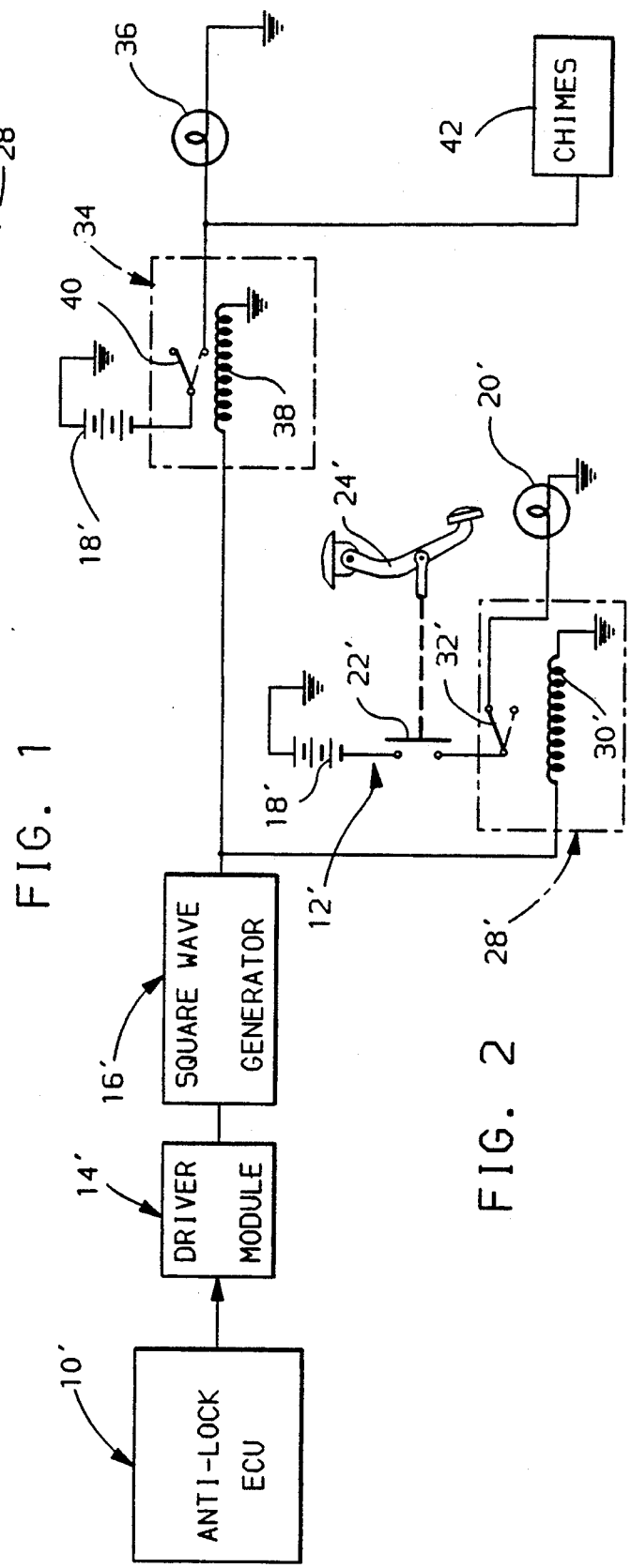

BRAKING INDICATOR SYSTEM

This invention concerns braking systems for motor vehicles and more particularly concerns a braking indicator system which causes a stop light to provide a flashing signal to a following vehicle whenever the anti-lock braking system of the vehicle is activated.

BACKGROUND

In order to prevent wheel lockup when excessive brake pressure is applied to the wheel brakes by the vehicle operator and to maintain a stable braking condition, it is becoming quite common for present day vehicles to have an electrically controlled anti-lock braking system. In general, these systems respond to parameters derived from wheel speed, such as wheel acceleration or deceleration and wheel slip, to control or limit the pressure applied to the wheel brakes. Generally, these systems provide for a decrease in brake pressure when an incipient wheel lockup condition is detected to allow the vehicle to recover from the incipient lockup condition followed by a reapplication of braking pressure to the wheel. This cycle is rapidly repeated until the vehicle stops or until the operator applied braking pressure is reduced to a level below that which produces an incipient wheel locking condition.

SUMMARY OF THE INVENTION

The present invention intends to combine the anti-lock braking system of the type described above with the stop light electrical circuit in a manner so as to cause the stop light to flash at a predetermined high rate when the brake pedal is depressed but only when the anti-lock brake system is activated. In one form of the invention, this is realized by providing a braking indicator system which includes an electric circuit having a normally closed switch which allows continuous energization of the stop lamp upon depression of the brake pedal if the anti-lock braking system is not activated. However, upon depression of the brake pedal under conditions which cause the activation of the anti-lock braking system, drive means serve to rapidly open and close the normally closed switch causing the stop light to provide a flashing signal so as to indicate to the following vehicle that the anti-lock braking system is controlling the braking of the vehicle. In the preferred form, the drive means for providing this result includes a drive module and a square wave generator connected in series between the electronic control unit of the anti-lock braking system and the normally closed switch. Thus, when the anti-lock braking system is activated due to excessive brake pressure being applied to the wheel brakes, the electronic control unit will provide an output from a discrete output port which is received by the driver module. The driver module, in turn, generates a drive signal which is received by the square wave generator and causes the latter to open and close the relay at a predetermined high rate so that the stop light intermittently is energized and deenergized to convey the message to the following vehicle that the braking vehicle's anti-lock brake system has been activated. In a modified form of the invention, the braking indicator system not only causes the vehicle stop light lamp to flash when the anti-lock braking system is activated but also serves to inform the driver visually and audibly of the activation of the anti-lock braking system. In the modified system, the square wave generator serves to drive a normally open switch to pulse the anti-lock braking system telltale light on the instrument panel of the vehicle. In addition to pulsing the anti-lock braking system telltale light, the square wave generator interfaces with chimes to indicate to the driver of the activation of the anti-lock braking system.

The objects of the present invention are to provide a new and improved braking indicator system for a motor vehicle which causes the stop light to flash at a predetermined high frequency only when the anti-lock braking system of the vehicle is activated; to provide a new and improved braking indicator system which includes switch means in the stop light electric circuit that is automatically opened and closed at a predetermined frequency so as to cause the stop light to flash whenever the vehicle anti-lock braking system is activated; to provide a new and improved braking indicator system for a vehicle that provides a visual signal to the following vehicle and an audible and visual signal to the driver of the leading vehicle that its anti-lock braking system has been activated as a result of depression of the brake pedal; and to provide a new and improved vehicle braking indicator system that provides a continuous energization of the vehicle stop light under normal braking conditions, but which causes the stop light to be intermittently energized at a relatively high frequency when the anti-lock braking system of the vehicle is activated.

BRIEF DESCRIPTION OF THE DRAWINGS

Other objects and advantages of the present invention will be more apparent from the following detailed description when taken with the drawings in which FIG. 1 is a schematic diagram of a braking indicator system for a motor vehicle made in accordance with the present invention, and FIG. 2 is a modified form of the braking indicator system shown in FIG. 1.

DETAILED DESCRIPTION

Referring now to the drawings and more particularly FIG. 1 thereof, a motor vehicle brake indicator system is shown which includes an electrical stop light system combined with an electronic control unit (ECU) 10 of an anti-lock braking system (ABS) which, in turn, is coupled to the electrical circuit portion 12 of the stop light system through a driver module 14 and a square wave generator 16.

More specifically, the electrical circuit portion 12 of the stop light system includes a source of electrical power such as a battery 18, a motor vehicle rear stop light lamp 20, and a normally open brake switch 22 which is adapted to be closed by the vehicle driver upon depression of a conventional brake pedal 24 which is suitably supported for pivotal movement by a pivotal connection 26. In addition, switch means 28 in the form of a relay is located in series with the brake switch 22 and the lamp 20 and includes the usual relay coil which, when energized, opens normally-closed contacts 32. Thus, during normal braking conditons when the anti-lock braking system is not activated, depression of the brake pedal 24 by the driver causes continuous energization of the lamp which is then visible to the following vehicle.

When braking conditions are such that wheel lockup of one or more of the vehicle wheels may occur, the anti-lock braking system will be activated so as to maintain a stable braking condition. When this occurs, an output signal from a discrete output port of the anti-lock braking system ECU 10 is coupled to the drive module 14 which provides a drive signal to the square wave generator 16. The output from the drive module 14 is typically a discrete voltage signal for enabling the square wave generator 16. As a result, the square wave generator 16 delivers a square wave with a predetermined frequency such as, for example, between 3 to 5 Hz to the relay coil 30 causing the latter to be intermittently energized and deenergized so as to open and close the contacts 32. This, in turn, causes a flashing of the stop light lamp 20 to alert the following driver that the anti-lock braking system of the vehicle has been activated.

A modified form of the invention is shown in FIG. 2 in which the components corresponding to those shown in FIG. 1 are identified by the same reference numerals but primed. In this case, the braking indicator system not only causes the stop light 20' lamp to flash when the anti-lock braking system is activated, but also serves to inform the driver visually and audibly of the activation of the anti-lock braking system. Thus, as seen in FIG. 2, the square wave generator 16' can serve to drive a second relay 34 to pulse the ABS telltale light 36 on the instrument panel of the vehicle. In this instance, it will be noted that the relay 34 includes a relay coil 38 and normally-open contacts 40 so that the lamp 36 is not energized until the ABS is activated. In addition to pulsing the ABS telltale light 36, the square wave generator 16' interfaces with chimes 42 (such as currently used to indicate on GM vehicles that the headlamps are still lit after the ignition key is turned to the "off" position) and thereby informs the driver of the activation of the ABS. As would be understood to those skilled in the art, this invention can similarly be implemented for traction control systems operating during vehicle acceleration.

Various changes and modifications can be made in the system disclosed herein without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A braking indicator system for a vehicle having an anti-lock braking system including an anti-lock electronic control unit, a brake pedal, a stop light lamp mounted on the rear end of said vehicle, an electric circuit including a normally open switch and a normally-closed switch providing for continuous energization of said stop light upon depression of said brake pedal, and means including a square wave generator electrically connected between said anti-lock electronic control unit and said normally closed switch for causing the normally closed switch to provide a flashing signal upon activation of said anti-lock braking system.

2. A braking indicator system for a vehicle having an anti-lock braking system, a brake pedal, a stop light lamp mounted on the rear end of said vehicle, an electric circuit including a normally open switch and a normally-closed switch providing continuous energization of said stop light lamp upon depression of said brake pedal under normal braking conditions, means electrically connected to said normally closed switch for causing said stop light lamp to provide a flashing signal upon activation of said anti-lock braking system, said means including an anti-lock electronic unit providing an output signal from a discrete output port when the anti-lock brake system limits wheel slip of said vehicle, a driver module for receiving said output signal from said electronic control unit and for generating a driving signal, and a square wave generator which upon receiving said driver causes said normally closed switch to open and close at a predetermined high frequency so as to provide said flashing signal of said stop light lamp.

3. A braking indicator system for a vehicle having an anti-lock braking system, a brake pedal and a stop light lamp mounted on the rear end of said vehicle and a sound generating device located in the passenger compartment of the vehicle, an electric circuit including a normally closed switch means providing continuous energization of said stop light lamp upon depression of said brake pedal under normal braking conditions and also a normally open switch means for causing said generating device to provide an audible signal to the vehicle driver, means electrically connected to said normally closed switch means and said normally open switch means for causing said stop light lamp to provide a flashing signal upon activation of said anti-lock braking system and simultaneously provide said audible signal to the driver, said means including an anti-lock electronic control unit providing an output signal from a discrete output port when the anti-lock brake system limits wheel slip of said vehicle, a driver module for receiving said output signal from said electronic control unit for generating a driving signal, and a square wave generator interfacing with said normally open switch means and said normally closed switch means so that upon receiving said driver signal, both of said switch means open and close at a predetermined frequency so as to provide said flashing signal of said stop light lamp and said audible signal to said driver.

* * * * *